US012614110B1

(12) United States Patent
Zheng et al.

(10) Patent No.: US 12,614,110 B1
(45) Date of Patent: Apr. 28, 2026

(54) SELF-ATTENTION MASKS FOR TRAINING MODELS

(71) Applicant: Amazon Technologies, Inc., Seattle, WA (US)

(72) Inventors: Hongbin Zheng, San Jose, CA (US); Yunxuan Yu, San Jose, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 837 days.

(21) Appl. No.: 17/954,761

(22) Filed: Sep. 28, 2022

(51) Int. Cl.
*G06N 20/00* (2019.01)
*G06F 18/20* (2023.01)

(52) U.S. Cl.
CPC ............. *G06N 20/00* (2019.01); *G06F 18/29* (2023.01)

(58) Field of Classification Search
CPC ................................. G06N 20/00; G06F 18/29
See application file for complete search history.

(56) References Cited

U.S. PATENT DOCUMENTS

| | | | | | |
|---|---|---|---|---|---|
| 10,909,401 | B2 * | 2/2021 | Burachas | .................. | G06T 7/11 |
| 11,468,365 | B2 * | 10/2022 | Olgiati | ...................... | G06T 1/20 |
| 2021/0158206 | A1 * | 5/2021 | Klein | ...................... | G06F 40/30 |
| 2024/0289960 | A1 * | 8/2024 | Zhong | ...................... | G06N 3/00 |

OTHER PUBLICATIONS

Fchollet, "Training & Evaluation with The Built-in Methods", Jul. 24, 2023 UTC. https://www.tensorflow.org/guide/keras/training_with_built_in_methods (Year: 2023).*

Zhu et al. "Understanding Masking & Padding", Jul. 24, 2023 UTC. https://www.tensorflow.org/guide/keras/understanding_masking_and_padding (Year: 2023).*

He et al. "Query Processing on Tensor Computation Runtimes", Aug. 1, 2022, https://arxiv.org/pdf/2203.01877v3 (Year: 2022).*

Huntersperger et al. "Introduction to graphs and tf.function", Aug. 15, 2024 UTC. https://www.tensorflow.org/guide/intro_to_graphs (Year: 2024).*

Badreddine et al. "Logic Tensor Networks", Dec. 23, 2021, https://arxiv.org/pdf/2012.13635 (Year: 2021).*

* cited by examiner

*Primary Examiner* — Matthew J Ellis
(74) *Attorney, Agent, or Firm* — Kilpatrick Townsend & Stockton LLP

(57) ABSTRACT

A computer-implemented technique for optimizing self-attention masks is described. At compile time, a machine learning graph of an artificial intelligence model is analyzed. The machine learning graph includes a set of operators. Analysis includes identifying one or more mask operators and determining what fields of input tensors are masked. Optimizations at compile-time are used to eliminate instructions during training of the artificial intelligence model.

19 Claims, 6 Drawing Sheets

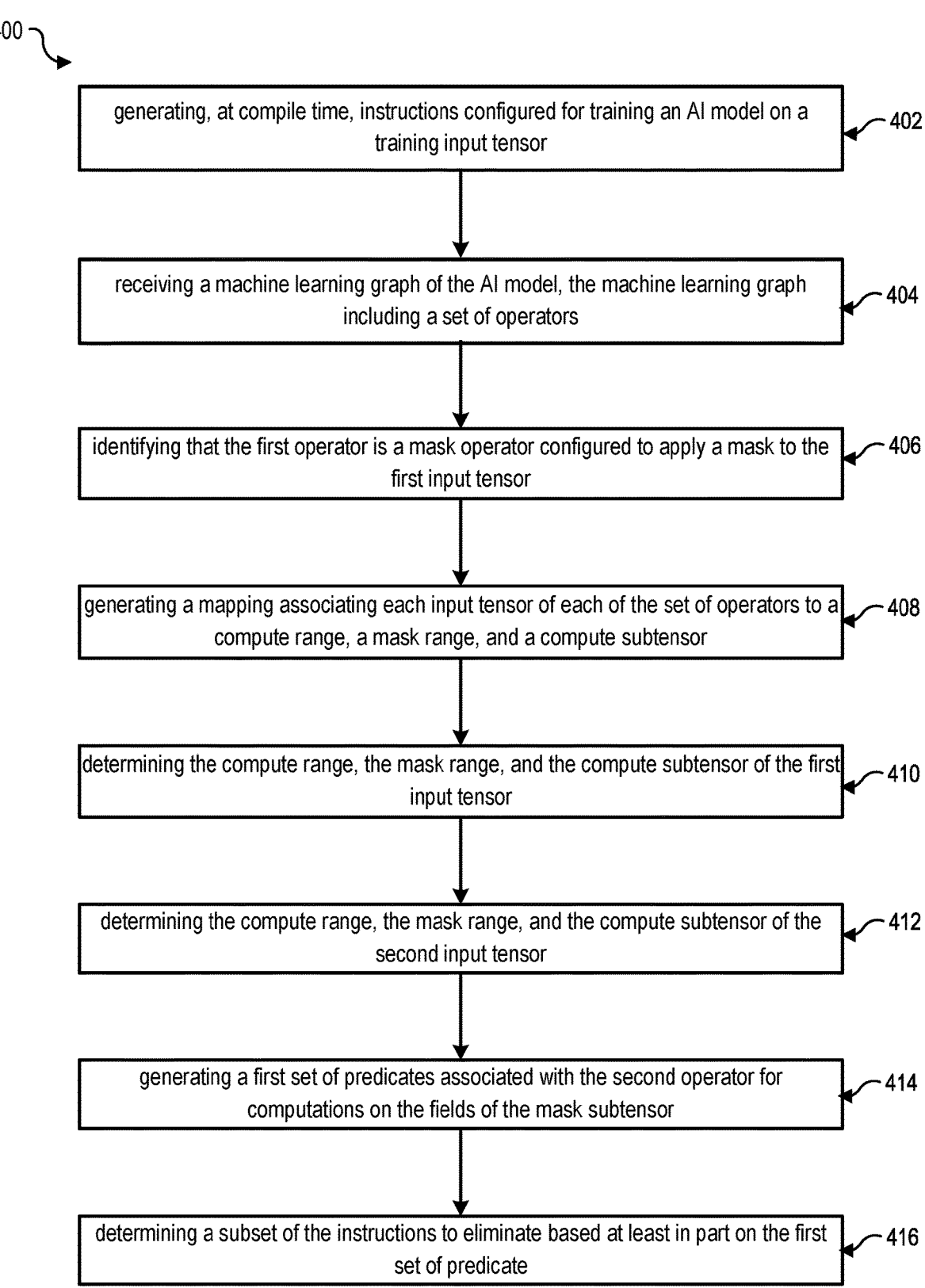

400 generating, at compile time, instructions configured for training an AI model on a training input tensor ⟵ 402 receiving a machine learning graph of the AI model, the machine learning graph including a set of operators ⟵ 404 identifying that the first operator is a mask operator configured to apply a mask to the first input tensor ⟵ 406 generating a mapping associating each input tensor of each of the set of operators to a compute range, a mask range, and a compute subtensor ⟵ 408 determining the compute range, the mask range, and the compute subtensor of the first input tensor ⟵ 410 determining the compute range, the mask range, and the compute subtensor of the second input tensor ⟵ 412 generating a first set of predicates associated with the second operator for computations on the fields of the mask subtensor ⟵ 414 determining a subset of the instructions to eliminate based at least in part on the first set of predicate ⟵ 416

FIG. 4

SELF-ATTENTION MASKS FOR TRAINING MODELS

BACKGROUND

The training of an artificial intelligence (AI) model can be time and computation intensive. In some cases, AI models may use masks (such as, for example, self-attention masks) during training. In some cases, these AI models may include machine learning (ML) models such as transformer models.

BRIEF DESCRIPTION OF THE DRAWINGS

Various embodiments in accordance with the present disclosure will be described with reference to the drawings, in which:

FIG. 4 illustrates a computer-implemented method for optimizing training of an AI model that includes a self-attention mask;

DETAILED DESCRIPTION

Figure 1:
FIG. 1 illustrates an example self-attention mask for use in describing techniques herein.

Techniques described herein include optimization of self-attention masks during training of artificial intelligence (AI) models, including machine learning (ML) models. Many AI models can use a self-attention mechanism in order to determine scores relating to tokens of an input. An input can have multiple parts which are referred to as tokens. Scores (sometimes referred to as attention scores) can be used to determine relationships between tokens of an input during training of an AI model which will be used when the AI model processes information post-training. The self-attention mechanism can allow an AI model to store relationships between large numbers of tokens of an input. An example AI model that uses a self-attention mechanism is the transformer model (or simply, "transformer"). One application for a transformer is for use in a natural language processing AI model. In one such natural language processing AI model, the transformer can be used to predict the next word or words given previous words in a sentence or paragraph.

During training of the natural language processing AI model, the transformer will receive sentences or paragraphs which can be used to create multiple training examples. For example, an AI model can be designed to predict the next word after a series of other words. An input could be a sentence such as "Hi, how are you?" This input can be divided into multiple training examples where the model is being trained to predict the next word, the training examples including, for example, "Hi", "Hi, how", "Hi, how are", and "Hi, how are you". Oftentimes, using multiple training examples from a single input leads to faster training. Training can be fast, for example, because the AI model can be trained in parallel on multiple training examples from a single input where the target output is known.

However, using multiple training examples from a single input would not be useful if the AI model "cheated" such that it used the target output as an input. In the training example of a sentence, the AI model has been provided the target output (the next word) for each training example since the AI model knows the actual next word in the sentence. For example, while the AI model is processing the training example of "Hi, how" and predicting the next word, the AI model should not simply "look ahead" and use the knowledge that the next word is "are". In order to make the training effective, the AI model must be prevented from simply checking the target output.

A self-attention mask is used to prevent the AI model from using attention scores and parts of a training example that should not be used. In the transformer example, a self-attention mask may be referred to as a look ahead mask which masks the future values such that the AI model can't use those values to cheat during training.

Training is a large part of developing AI models and is computationally costly. In some examples, the techniques described herein are used to determine which outputs will be masked at compile time prior to run time of training. Once it is known which outputs will be masked at compile time, the self-attention mask operation and any affected operations can be optimized to not require additional computations. This optimization can greatly reduce the computational costs of training AI models with self-attention masks.

It would be apparent to one skilled in the art that the implementations contained herein are not exclusive to natural language processing AI models or transformers. Rather, the techniques and implementations contained herein are applicable to any AI models or training that relates to self-attention masks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example self-attention mask 100. A self-attention mask 100 can be a tensor. In this example, the self-attention mask 100 is a tensor with a height of 2048 rows and a width of 2048 columns. A specific pairing of a row and column can be referred to as a field which contains or holds a value. This self-attention mask 100 is then divided into tiles with a height of 128 rows and a width of 512 columns. Dividing a tensor into tiles can be useful to optimize processing of the tensors by hardware specifically designed for tensors and/or artificial intelligence (AI) models.

The self-attention mask 100 can be used during a mask operator of a machine learning graph. The self-attention mask 100 can be designed to prevent an attention mechanism of an AI model from cheating while training. An attention mechanism of an AI model can be designed to divide an input into tokens and then determine relationships as attention scores between the tokens of an input.

As described above, a single input can be divided into multiple training example. For example, an AI model can be designed to predict the next word after a series of other words. An input could be a sentence such as "Hi, how are you?" This input can be divided into multiple training examples where the AI is being trained to predict the next word and where the training examples could include "Hi", "Hi, how", "Hi, how are", and "Hi, how are you". Using multiple training examples from a single input can lead to faster training as the AI model can be trained in parallel on multiple training examples from a single input. However, as described above, using multiple training examples from a single input would not be useful if the AI model cheated such that it used the target output as an input. To make the training effective, the AI model can be prevented from simply checking the target output. This is accomplished by using a self-attention mask to prevent the AI model from accessing attention scores and parts of a training example that should not be used.

In the illustrated example, the self-attention mask 100 is a triangular self-attention mask. A triangular self-attention mask can also be referred to as a look ahead mask. The triangular self-attention mask is designed to prevent using attention scores for future tokens, such as future words when training an AI model to predict the next word. In order to prevent using attention scores for future tokens, a self-attention mask will be applied to the attention scores through some kind of operation. A self-attention mask can be applied to the attention scores using a variety of operations and/or algorithms.

Attention scores can also be stored in tensors where the information across each row represents a training example and attention scores are determined to represent relationships between the words in the training example. For example, "Hi, how are you?" could be divided into a four row and four column tensor. The columns would correspond to the tokens of "Hi", "how", "are", and "you". The rows would also correspond to correspond to the tokens of "Hi", "how", "are", and "you". However, each row is differentiated by being tailored to represent the training examples of "Hi", "Hi, how", "Hi, how are", and "Hi, how are you" by use of a self-attention mask as described herein.

In some implementations, a self-attention mask is a tensor of the same size as the attention scores tensor. In some examples, the self-attention mask can be added to the attention scores previously calculated. In such examples, the fields of the self-attention mask associated with attention scores to be masked can have a value of negative infinity (where negative infinity is defined by the AI model) while the other fields can be zero. With reference to FIG. 1, the negative infinity tiles 120 (lightly shaded in FIG. 1) can be filled with values of negative infinity while the zero tiles 130 (unshaded in FIG. 1) can be filled with values of zero. However, the mixed tiles 110 (darkly shaded in FIG. 1) will have a mix of tiles with a value of zero and tiles with a value of negative infinity. Dividing the tiles into negative infinity tiles 120, zero tiles 130, and mixed tiles 110, optimizations for the processing of tiles as a whole can be introduced.

In some implementations, the self-attention mask 100 may not be a triangular mask as shown in the illustrated example. The triangular self-attention mask may be useful when an input has a sequence, such as a sentence. When predicting the next word in a sentence, an AI model should only use the previous words to determine the next word. In various examples, the self-attention mask 100 could have negative infinity fields or tiles in any necessary configuration (e.g., other than a triangular shape) to prevent the use of attention scores associated with the applicable tokens. As such, the techniques described herein can be applied to any type of self-attention mask.

In some examples, the application of a self-attention mask to the attention scores creates masked scores. In some implementations, a softmax operator can then be applied to the masked scores which will set the attention scores including future tokens to zero.

Figure 2:
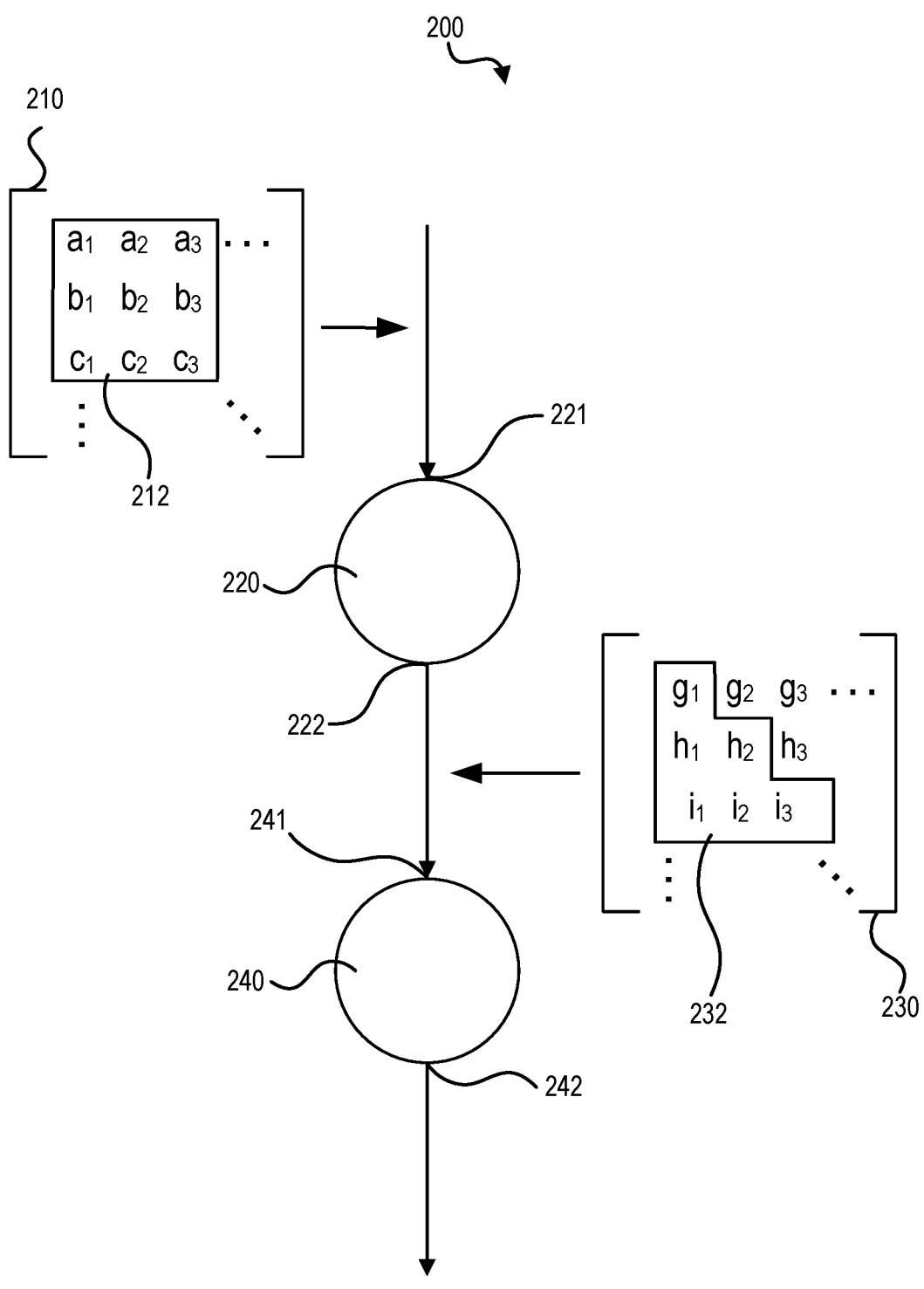
FIG. 2 illustrates an example machine learning graph for use in describing techniques herein.

FIG. 2 illustrates an example machine learning graph 200. The machine learning graph 200 is a data structure used to describe relationships and interactions between entities.

Here the machine learning graph 200 corresponds to a topological description of the operations performed by the corresponding AI or machine learning model. In the illustrated example, the machine learning graph 200 includes at least two operators 220 and 240. In some implementations, the machine learning graph 200 can have one or more operators. Each operator has inputs and outputs. In some implementations, each operator can have one or more inputs. In some implementations, each operator can have one or more outputs. In FIG. 2, operator 220 has an input 221 and an output 222. Operator 240 has an input 241 and an output 242.

The inputs into the operators can include many types of information, for example tensor 210 and tensor 230. The output of one operator can be fed as an input into another operator. For example, the output 222 of operator 220 is the input 241 of operator 240, which is tensor 230.

Operators can include operations such as a self-attention mechanism, a matrix multiplication (matmult), a mask, a softmax operations, and the like. Some operations can be described mathematically while other operations can be described at a higher abstraction. For example, a matrix multiplication operation is a mathematical description of an operation/operator while a softmax operation is a higher level abstraction that describes the outcome of one or more mathematical operations. There are many types of operations that are used with AI models. The techniques described herein can apply to any operations and/or operators used by AI models.

Operators can also take in multiple inputs in multiple different forms. For example, an operator can have an input be a N by N dimensional tensor or an N by N dimensional matrix such as tensor 210 and tensor 230. An operator can also have a single number such as an integer, real number, complex number, or any other type of number. An operator can also have a range as an input. For example, an operator could receive a range of [0, 60) using range notation where brackets are inclusive of endpoints of the range while parenthesis indicate non-inclusive endpoints of the range. This range notation is used herein. A range can even comprise a single value, such as [60, 60] which can also be notated as (60, 60). An operator can also have a tuple as an input. The tuple could pair any number and any combination of multiple types of inputs. For example, a 4-tuple could include two tensors, one complex number, and one range.

Operators can run operations on large tensors and many inputs. Such operators can have significant computational costs and thus high energy and time costs. The techniques herein describe optimizations that can reduce the computational costs of these operators, more specifically self-attention masks.

Optimizations can be made once the AI model and machine learning graph are known. The optimizations are made at compile time during training of the AI model, such that computations do not need to be made by operators at run time.

A machine learning graph can be received as input to the compiler subsystem at compile time in order to generate the optimizations. In some examples, the compiler subsystem can receive the machine learning graph 200.

The compiler subsystem can identify the mask operators in the machine learning graph. In some implementations, the machine learning graph will have one mask operator. In some implementations, the machine learning graph will have one or more mask operators. There can be multiple forms or types of mask operators that are implemented in the machine learning graph. Different users of the AI model and/or machine learning graph may implement a mask operator using different forms or types of mask operators. The compiler subsystem can identify the mask operators and then modify the mask operators into a canonical form for further processing.

Mask operators in a canonical form select every field in an input tensor to either remain the same value (no change is made), or be modified by the mask. This process can be referred to as masking. In some implementations, the modified fields are set to a mask value. In some implementations, the mask operator includes a mask tensor and an operation (such as addition). The mask tensor is comprised of fields with the value zero and fields with the mask value of the mask operator. The operation is then applied to the mask tensor and input tensor. For example, the input tensor and the mask tensor can be added together. In some implementations, the mask value is negative infinity (or some value that is representative of negative infinity) such that the addition of the input tensor and the mask tensor renders certain fields of the output of the mask operator to negative infinity.

Mask operators can also include an argument for which fields of the input tensor will be masked. The fields of the input tensor that will be masked can be determined by an affine expression associated with the mask operator. In some implementations, the affine expression of the mask operator can be derived from the conversion of another mathematical function or value associated with the mask operator.

The compiler subsystem can propagate a mask value by analyzing the machine learning graph. Propagation of the mask value will allow a mask value to be used as a constant (for example, using the memset function) at execution time thus reducing the amount of computations needed to complete training. The mask value is associated with the self-attention mask. Analysis of the machine learning graph includes understanding the inputs and outputs of the operators. In some implementations, each operator in a machine learning graph will include at least one tensor as an input. In some implementations, each operator in a machine learning graph will include at least one tensor as an output.

Each tensor, input or output, can be divided into a compute subtensor and a mask subtensor. The compute subtensor represents the subset of fields of the tensor that are computed by non-mask operators. With reference to FIG. 2, the output 222 of operator 220 is the tensor 230. Here, the compute subtensor 231 of the tensor 230 includes the fields $g_1$, $h_1$, $h_2$, $i_1$, $i_2$, and $i_3$. Associated with the compute subtensor is a compute range. The compute range refers to the range of values for the fields in the compute subtensor. For example, the compute range for the fields of the compute subtensor could be a range [0, 1] corresponding to an attention score. The compute subtensor can be determined by the intersect of a list of affine expressions of the index of each tensor dimension, thus providing an N-dimensional polygon in the tensor index space. For example, the variables in the affine expressions determine which fields of the tensor are part of the compute subtensor.

The mask subtensor represents the subset of fields of the tensor that are a) not computed by the non-mask operators and b) have a mask applied to these fields. With reference to FIG. 2, the mask subtensor for tensor 230 includes at least $g_2$, $g_3$, and $h_3$. Associated with the mask subtensor is a mask range. The mask range refers to the range of values for the fields in the mask subtensor. With reference to FIG. 2, operator 220 can be a mask operator thus increasing the number of fields that are masked as seen when comparing the compute subtensor 212 of tensor 210 and the compute subtensor 232 of tensor 230.

Each field of a tensor is either a part of the compute subtensor or the mask subtensor. The union of the fields of the compute subtensor and the fields of the mask subtensor is the universal tensor space for that tensor (for example, the entire set of fields of that particular tensor). There is no intersection of the fields between the compute subtensor and the mask subtensor (for example, the intersection of the compute subtensor and the mask subtensor is the empty set). As such, each field of the output tensor is either a field of the compute subtensor or a field of the mask subtensor.

The compiler subsystem can generate the graph-compute subtensor and graph-mask subtensor for the machine learning graph. This graph-compute subtensor and graph-mask subtensor can be used to optimize the training of the AI model at run-time by facilitating changes to run-time instructions.

To generate the graph-compute subtensor and graph-mask subtensor for the machine learning graph, the compiler subsystem can also initialize a map data structure, which can be referred to as a range-value map, which will map each input tensor of an operator to an intermediate 3-tuple. The intermediate 3-tuple can contain values for 1) a compute range, 2) a mask range, and 3) a compute subtensor. The intermediate 3-tuple for each input can be used to determine the mask range and the compute subtensor of the output of the operator.

To generate the compute range of the intermediate 3-tuple for every input tensor, the operators of the machine learning graph can be topologically analyzed. Topological analysis of a machine learning graph includes analyzing the machine learning graph in the order of relationships starting from the initial input. For example with reference to FIG. 2, topological analysis of the machine learning graph 200 begins with the input 221 and the operator 220. Once analysis has been concluded with respect to input 221 and the operator, analysis can proceed to the output 222 (corresponding to the input 241) and the operator 240. In another example with reference to FIG. 3, topological analysis of the machine learning graph 300 would include analyzing input 320 and corresponding operator 310 and input 322 and corresponding operator 312 before analyzing inputs 324, 325 and operator 314.

Returning to FIG. 2, the compute range for each input can be determined based on range analysis of the output of preceding operator(s). When performing range analysis, the compiler subsystem can determine the compute range for an output tensor of an operator based at least on an input tensor and the operation (for example, a matmult or a softmax) associated with the operator. For example, with reference to FIG. 2, the compiler subsystem will determine the range of output values in the output 222 of operator 220 using range analysis. In this example, the output 222 is the tensor 230. The compute range of the output 222 refers to the range of values for fields in the compute subtensor 232 of tensor 230. The compute range of the output 222 can be based at least on the input 221, an initial input in the machine learning graph 200. The compiler subsystem can have an appendix (e.g., a lookup table) which can be used to determine how an operation affects the compute range of the output. The appendix can be generated by any appropriate for determining how various operators can affect an output range of values based on an input range of values.

With regards to a first operator (for example, operator 220), the compiler subsystem can initialize the compute range for the input (for example, input 221). In some implementations, the compute range for the input tensor of the first operator can be (−infinity, infinity) in range notation.

In some implementations, the compute range for the input tensor of the first operator can refer to a smaller range based on the type of information to be operated on. For example, if the values in the input tensor correspond to RGB values the range can be [0, 255].

When determining the compute range of the output of the first operator, the compute range of the output of the first operator can be based on range analysis of the input to the first operator and the operation associated with the first operator.

For operators with a single input tensor, the compiler subsystem can use the compute range of the output of a preceding operator as the compute range of the input tensor. For example, the compute range of the output 222 of operator 220 is the same as the compute range of the input 241 of operator 240. Thus, the compute range of the output 242 of operator 240 can be determined based at least on range analysis of the compute range of the tensor 230 (the output 222 of operator 220 and the input 241 of operator 240).

To generate the mask range and the compute subtensor of the intermediate 3-tuple for every input tensor, the operators of the machine learning graph can be topologically analyzed. In some implementations, the topological analysis for generating the mask range and the compute subtensor is done after the topological analysis of generating the compute range for every input tensor.

Generating the mask range and the compute subtensor of the intermediate 3-tuple can include generating a result range and a result domain associated with a preceding operator. Generating the result range and the result domain can include generating a predicate 2-tuple for each input tensor into the preceding operator. The predicate 2-tuple contains values for 1) a p-range and 2) a p-domain. The predicate 2-tuple is used to represent how each input tensor affects the result range (used to generate a mask range) and the result domain (used to generate a compute subtensor).

The p-range and p-domain for an input can be determined based at least on the mask range of the input. If the mask-range is non-existent (for example, determined to be "none") then the p-range can be determined to be the compute range of the input and the p-domain is an empty set (or empty domain or empty tensor). If there is a mask-range value, then the p-range can be determined to be the mask range of the input and the p-domain to the compute subtensor of the input.

For a non-mask operator with a single tensor input, the result range is equivalent to the p-range and the result domain is equivalent to the p-domain.

With regards to a first operator (for example, operator 210) that is also a non-mask operator, the mask range can be determined to be to none (or is non-existent). Thus, the p-range can be determined to be the compute range of the input and the p-domain can be determined to be the empty set.

For a mask operator, the result domain and the result range are determined differently from other single input operators (a mask operator is a single input operator). As noted previously, the mask operators in a machine learning graph will have already been determined.

Mask operators can be associated with alternate notations which can be converted into an affine expression, then the affine expression can be converted into a result domain. For mask operators, the result range is the range defined as [mask value, mask value] such that the result range is defined as a single value and not a range.

Once result domain and result range have been computed, values will be generated for populating mask range and compute domain values of the range-value map previously initialized. In generating values for the range-value map values, several conditions must be ascertained. A first condition determines if the result range is in a form of [a, a] such that it is a range that evaluates to a single value. A second condition determines if the result domain is not the universal tensor space. If the first condition is true (result range is in form [a, a] and the second condition is true (p-domain is not the universal tensor space), then the compute subtensor will be the result domain and the mask range can be determined to be the result range. Otherwise, the compute-domain will be the universal tensor space and the mask range can be determined to be none.

For the final operator of the machine learning graph, the result domain and result range will be computed as described above. The result domain for the final operator can be referred to as the final domain. The result range for the final operator can be referred to as the final range. If the final domain is the universal tensor space or the final range does not resolve to a single value, then no computations can be pruned in optimizing the self-attention mask. Otherwise, the final range (which corresponds to a mask range) resolved to a single value and can be referred to as a propagation mask value.

Once the mask range map has been fully populated and a mask value has been ascertained, operators can be annotated with the compute domain and the mask range of the intermediate 3-tuples of their input tensors as an extra attribute. In some implementations, the compute domains and mask ranges are only annotated to an operator if the mask range is not none. In some implementations, the propagation mask value can be annotated to operators where the compute domain does not represent the universal tensor space.

During code generation, predicates are generated for the elimination, generation, prevention of generating of run-time instructions for training the AI model based on the annotations of the compute domains and mask ranges on operators. The annotations of the compute domain and the mask range for certain operators can be used to generate predicates that save computations (for example, by eliminating instructions or preventing the generation of instructions) at run-time. For example, a first predicate that uses the compute domain can be evaluated to false when the instruction is not writing to the result tensor index space described by the compute domain. Here, the first predicate can save computations done by operators for fields that are not in the compute domain of that operator. In another example, a second predicate that uses the compute domain and the mask range (which evaluates to a mask value) can be used to run a memset instruction to write the mask value to the resulting tensor indexing space described by the mask subtensor. In some implementations, the mask subtensor is the subtensor resulting from the subtraction of the compute domain from the universal tensor space. In another example, a third predicate that uses the final domain and the final range can be used to run a memset instruction to write the propagation mask value to fields that are not associated with the final domain.

Mask operators can also be further optimized at run-time. Mask operators can be categorized as a selecting between two values, namely the existing value or replacing the existing value with the mask value. In certain tiles of an input tensor, all selections between the two values may be the same. For example with reference to FIG. 1, the negative infinity tiles 120 will all evaluate to the mask value. As such, there is no need to have a selection between two values at run-time but rather just a simple copy of the value. This can reduce the computations for values related to those tiles.

Figure 3:
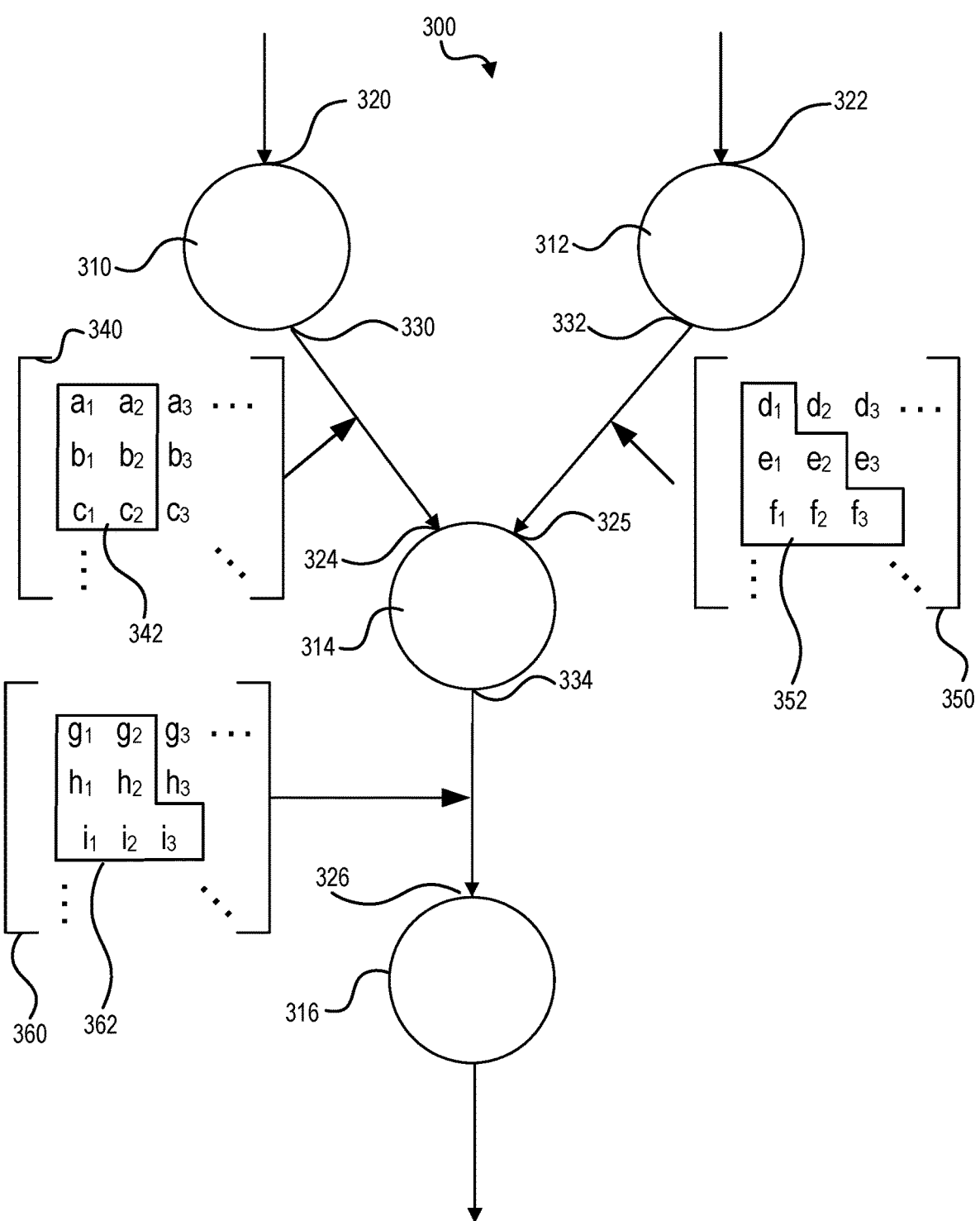
FIG. 3 illustrates a second example machine learning graph for use in describing techniques herein.

In FIG. 3, an example machine learning graph 300 is shown. Here, operator 314 has two inputs 324, 325. The output 334 of operator 314 is the input 326 of operator 316. Determining the compute range, mask range, and compute subtensor for the output tensor (for example, output 334) of an operator with more than one input tensor is described herein.

For operators with multiple input tensors, the compiler subsystem can use the compute range of all outputs of preceding operators as the compute ranges of the input tensors for use with range analysis. For example, the compute range of the output 330 of operator 310 is the same as the compute range of the input 324 of operator 314. Similarly, the compute range of the output 332 of operator 312 is the same as the compute range of the input 325 of operator 314. Thus, the compute range of the output 334 of operator 314 can be determined based at least on range analysis of 1) the compute range of the tensor 340 (the output 330 of operator 310 and the input 324 of operator 314) and 2) the compute range of the tensor 352 (the output 232 of operator 312 and the input 325 of operator 314). The compute range of the output 334 of operator 314 is the compute range of the input 326 of operator 316.

For operators with multiple input tensors, the result range and the result domain are based at least on the p-range and the p-domain for each input tensor. The result range is based on range analysis of the p-ranges for each input and the operation associated with the operator. For example, the result range for the input 326 of operator 316 can be determined based at least in part on the p-range of input 324, the p-range of input 325, and the operation associated with operator 314. The result domain is the set union of the p-domains of the inputs, referring to fields of the input tensors. For example, the result domain of output 334 is the set union of the p-domain of input 324 and the p-domain of input 325. The union of the compute subtensor 342 and the compute subtensor 352 can be seen to define the compute subtensor 362 of tensor 360.

Determining the mask range and the compute subtensor for the output tensor of an operator with more than one input tensor uses the same operations based on result range and result domain as described herein.

With reference to FIG. 4, some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 4 illustrates a compiler-implemented method 400 for optimizing training of an AI model that includes a self-attention mask, in accordance with some embodiments. One or more steps of the method 400 may be omitted during performance of the method 400, and steps of the method 400 may be performed in any order and/or in parallel. One or more steps of the method 400 may be performed by one or more processors. The method 400 may be implemented as a computer-readable medium or computer program product comprising instructions which, when the program is executed by one or more computers, cause the one or more computers to carry out the steps of the method 400. Such computer program products can be transmitted, over a wired or wireless network, in a data carrier signal carrying the computer program product.

At block 402, the method 400 can include generating, at compile time, instructions configured for training an AI model on a training input tensor. The AI model can include a self-attention mask such as, for example, the self-attention mask 100 of FIG. 1.

At block 404, the method 400 can include receiving a machine learning graph (such as, for example, the machine learning graph 200 of FIG. 2 or the machine learning graph 300 of FIG. 3) of the AI model, the machine learning graph including a set of operators (for example, operators 220, 240 of FIG. 2 or operators 310, 312, 314, 316 of FIG. 3). Each operator of the set of operators can receive an input tensor. Each operator can output an output tensor. The set of operators can include a first operator and a second operator. In some implementations, the second operator is a non-mask operator. The first operator can receive a first input tensor. The second operator can receive a second input tensor. The first output tensor of the first operator can be the second input tensor. Each input tensor and each output tensor can include fields holding values.

At block 406, the method 400 can include identifying that the first operator is a mask operator configured to apply a mask to the first input tensor. For example, operator 220 of FIG. 2 can be a mask operator. The mask operator can be associated with a mask subtensor and a mask value. The mask subtensor can include the fields of the first input tensor that will be set to the mask value.

At block 408, the method 400 can include generating a mapping associating each input tensor of each of the set of operators to a compute range, a mask range, and a compute subtensor. The compute subtensor can include the fields of the first input tensor that are not included by the mask subtensor. For example, the compute subtensor 232 of tensor 230 can be determined.

At block 410, the method 400 can include determining the compute range, the mask range, and the compute subtensor of the first input tensor. Determining the compute range of the first input tensor can based at least in part on range analysis. Determining the mask range of the first input tensor can be based at least in part on the mask value. Determining the compute subtensor of the first input tensor can based at least in part on an affine expression associated with the mask operator.

At block 412, the method 400 can include determining the compute range, the mask range, and the compute subtensor of the second input tensor. Determining the compute range of the second input tensor can be based at least in part on range analysis. Determining the mask range of the second input tensor can be based at least in part on the mask range of the first operator. Determining the compute subtensor of the second input tensor can based at least in part on the compute subtensor of the first operator.

In some implementations, the first operator can receive a third input tensor. For example, operator 314 of FIG. 3 has two inputs 324, 325 which can be used to determine values associated with input tensor 326 to operator 316. Determining the compute range of the second input tensor based at least in part on range analysis of the compute range of the first input tensor and a compute range of the third input tensor. Determining the mask range of the second input tensor can be based at least in part on one or more: the mask range of the first input tensor or the mask range of the third input tensor. Determining the compute subtensor of the second input tensor can based at least in part on the compute subtensor of the first input tensor and the compute subtensor of the third input tensor.

At block 414, the method 400 can include generating a first set of predicates, associated with the second operator, for computations on the fields of the mask subtensor. Generating the predicates can be based at least in part on the mask range of the second input tensor and the compute subtensor of the second input tensor.

At block 416, the method 400 can include determining a subset of the instructions to eliminate based at least in part on the first set of predicate as described herein. In some examples, the method 400 can further include eliminating the subset of the instructions.

In some implementations, a second set of predicates can be generated. The second set of predicates can be associated with the second operator. The second set of predicates can be generated for computing the mask value for each field in the mask subtensor based at least in part on the mask range of the second input tensor. The second set of predicates can be used to determine the subset of the instructions to eliminate.

In some implementations, a third set of predicates can be generated. The third set of predicates associated with the first operator. The third set of predicates can be generated for computations on the fields of the mask subtensor based at least in part on the mask range of the first input tensor and the compute subtensor of the first input tensor. The third set of predicates can be used to determine the subset of the instructions to eliminate.

In some implementations, a fourth set of predicates can be generated. The fourth set of predicates associated with the first operator. The fourth set can be generated for computing the mask value for each field in the mask subtensor based at least in part on the mask range of the first input tensor. The fourth set of predicates can be used to determine the subset of the instructions to eliminate.

In some implementations, generating memset instructions for each field in the mask subtensor can based at least on a set of predicates (for example, predicates based at least in part on a mask value and/or a mask range), wherein the memset instructions set the fields in the mask subtensor to the mask value.

Figure 5:
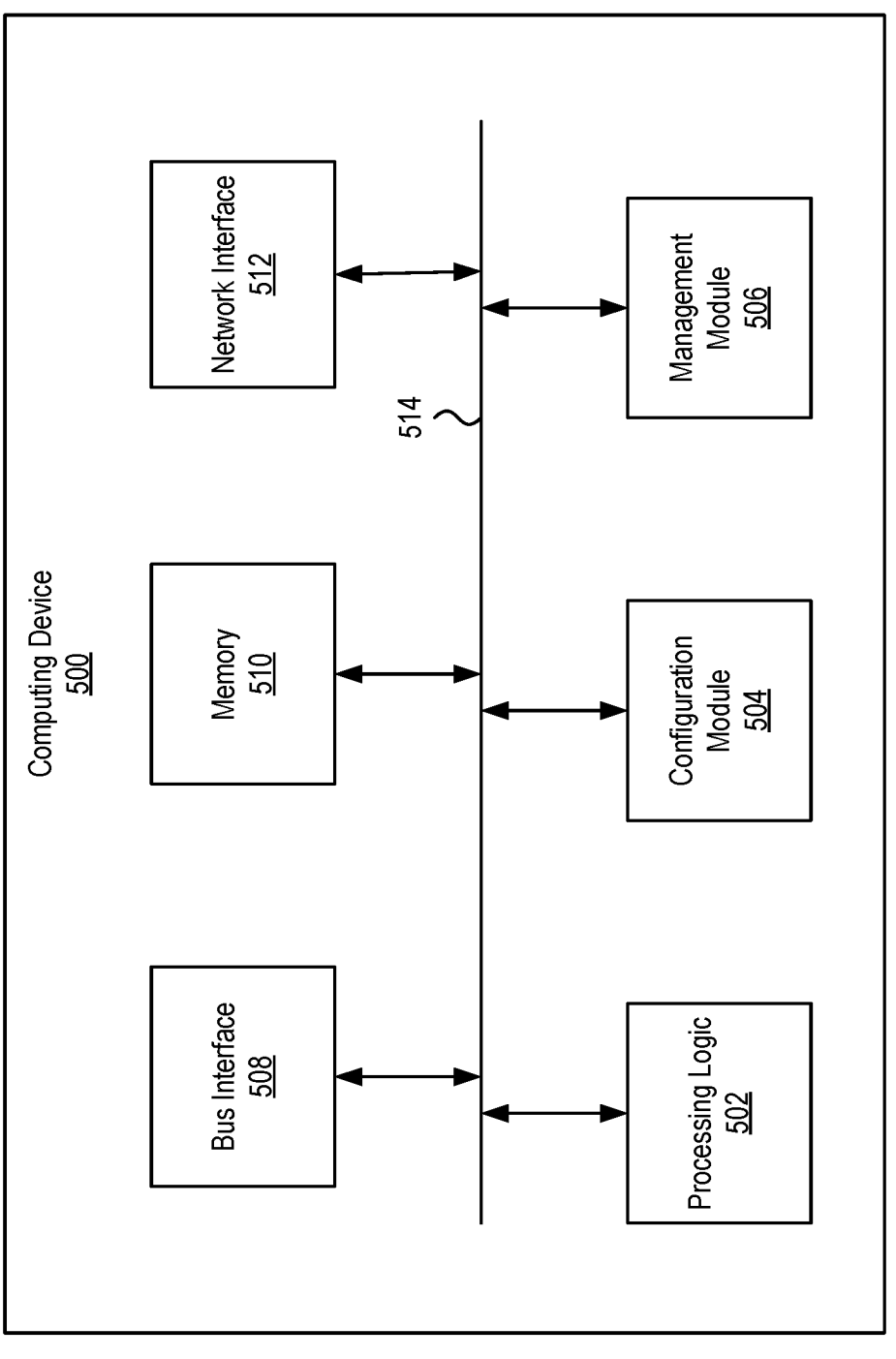
FIG. 5 illustrates an example computing device in which various embodiments can be implemented.

FIG. 5 illustrates an example of a computing device 500. Functionality and/or several components of the computing device 500 may be used without limitation with other embodiments disclosed elsewhere in this disclosure, without limitations. For example, the computing device 500 may be incorporated into a compiler subsystem and may be configured to perform one or more of the methods described herein, such as the method 400 described in reference to FIG. 4. In some examples, the computing device 500 may be configured to execute instructions for training an AI model, such as the instructions generated by way of the method 400.

In some examples, the computing device 500 may be a network device and may facilitate processing of packets and/or forwarding of packets from the computing device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 500 may be the recipient and/or generator of packets. In some implementations, the computing device 500 may modify the contents of the packet before forwarding the packet to another device. The computing device 500 may be a peripheral device coupled to another computer device, a switch, a router or any other suitable device enabled for receiving and forwarding packets.

In one example, the computing device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The computing device 500 may include additional modules, not illustrated here, such as components discussed with respect to the nodes disclosed in FIG. 6. In some implementations, the computing device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the computing device 500, while in other cases some or all of the memory may be external to the computing device 500. The memory 510 may store an operating system comprising executable instructions that, when executed by the processing logic 502, provides the execution environment for executing instructions providing networking functionality for the computing device 500. The memory may also store and maintain several data structures and routing tables for facilitating the functionality of the computing device 500.

In some implementations, the configuration module 504 may include one or more configuration registers. Configuration registers may control the operations of the computing device 500. In some implementations, one or more bits in the configuration register can represent certain capabilities of the computing device 500. Configuration registers may be programmed by instructions executing in the processing logic 502, and/or by an external entity, such as a host device, an operating system executing on a host device, and/or a remote device. The configuration module 504 may further include hardware and/or software that control the operations of the computing device 500.

In some implementations, the management module 506 may be configured to manage different components of the computing device 500. In some cases, the management module 506 may configure one or more bits in one or more configuration registers at power up, to enable or disable certain capabilities of the computing device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the computing device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 500 may include multiple network interface modules, each configured to communicate with a different network. For example, in these implementations, the computing device 500 may include a network interface module for communicating with a wired Ethernet network, a wireless 802.11 network, a cellular network, an Infiniband network, etc.

The various components and modules of the computing device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 6.

Figure 6:
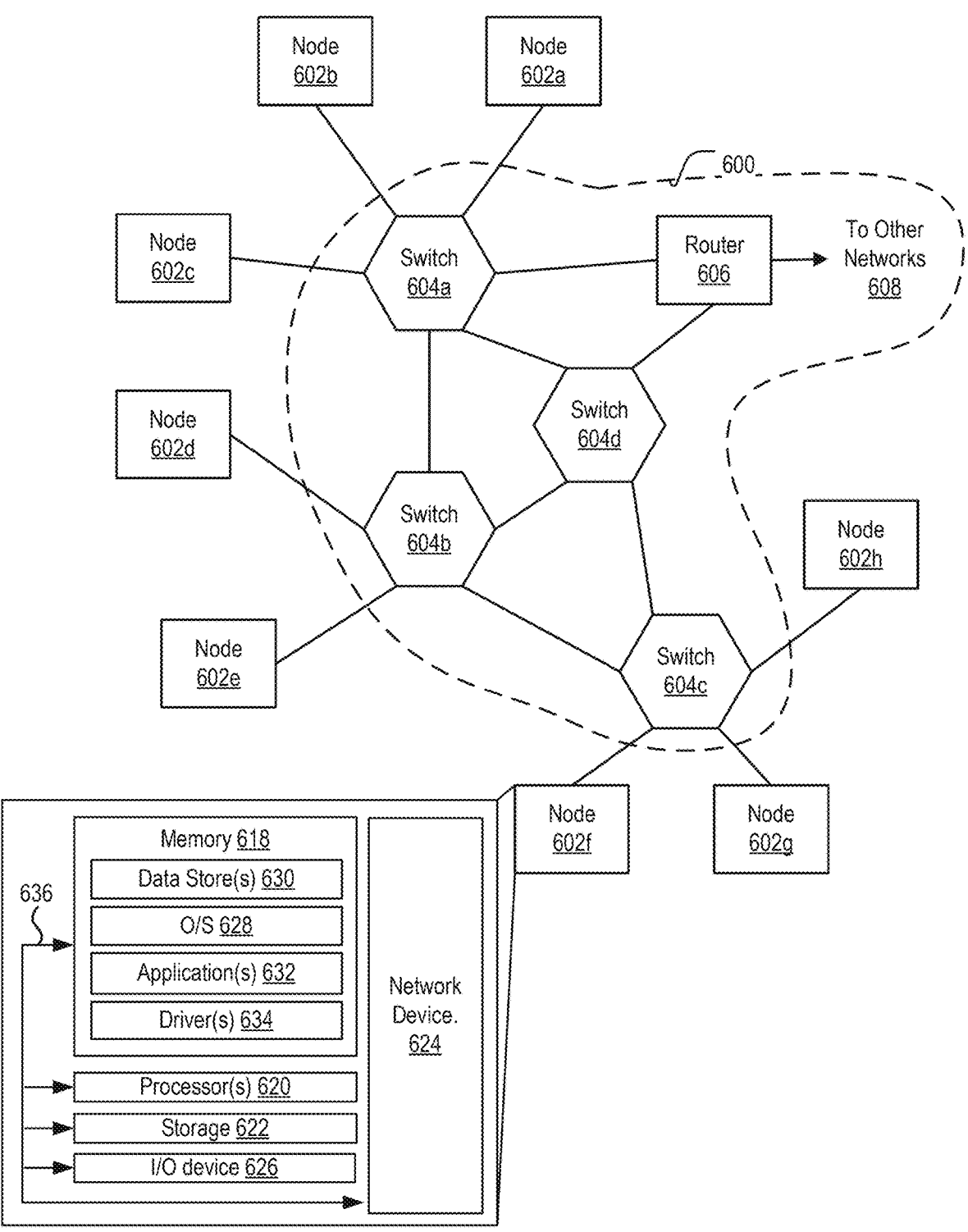
FIG. 6 illustrates an example network architecture in which various embodiments can be implemented.

FIG. 6 illustrates a network 600, illustrating various different types of computing devices 500 of FIG. 5, such as nodes comprising the computing device, switches and routers. In certain embodiments, the network 600 may be based on a switched architecture with point-to-point links. As illustrated in FIG. 6, the network 600 includes a plurality of switches 604a-604d, which may be arranged in a network. In some cases, the switches are arranged in a multi-layered network, such as a Clos network. A computing device 500 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 604a-604d may be connected to a plurality of nodes 602a-602h and provide multiple paths between any two nodes.

The network 600 may also include one or more computing devices 500 for connection with other networks 608, such as other subnets, LANs, wide area networks (WANs), or the Internet, and may be referred to as routers 606. Routers use headers and forwarding tables to determine the best path for forwarding the packets, and use protocols such as internet control message protocol (ICMP) to communicate with each other and configure the best route between any two devices.

In some examples, network(s) 600 may include any one or a combination of many different types of networks, such as cable networks, the Internet, wireless networks, cellular networks and other private and/or public networks. Interconnected switches 604a-604d and router 606, if present, may be referred to as a switch fabric, a fabric, a network fabric, or simply a network. In the context of a computer network, terms "fabric" and "network" may be used interchangeably herein.

Nodes 602a-602h may be any combination of host systems, processor nodes, storage subsystems, and I/O chassis that represent user devices, service provider computers or third party computers.

User devices may include computing devices to access an application 632 (e.g., a web browser or mobile device application). In some aspects, the application 632 may be hosted, managed, and/or provided by a computing resources service or service provider. The application 632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 608. Additionally, the user device(s) may be part of the distributed system managed by, controlled by, or otherwise part of the service provider computer(s) (e.g., a console device integrated with the service provider computers).

The node(s) of FIG. 6 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 602a-602h may include at least one memory 618 and one or more processing units (or processor(s) 620). The processor(s) 620 may be implemented in hardware, computer-executable instructions, firmware, or combinations thereof. Computer-executable instruction or firmware implementations of the processor(s) 620 may include computer-executable or machine-executable instructions written in any suitable programming language to perform the various functions described.

In some instances, the hardware processor(s) 620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 618 may store program instructions that are loadable and executable on the processor(s) 620, as well as data generated during the execution of these programs. Depending on the configuration and type of the node(s) 602a-602h, the memory 618 may be volatile (such as RAM) and/or non-volatile (such as ROM, flash memory, etc.). The memory 618 may include an operating system 628, one or more data stores 630, one or more application programs 632, one or more drivers 634, and/or services for implementing the features disclosed herein.

The operating system 628 may support nodes 602a-602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 628 may also be a proprietary operating system.

The data stores 630 may include permanent or transitory data used and/or operated on by the operating system 628, application programs 632, or drivers 634. Examples of such data include web pages, video data, audio data, images, user data, and so on. The information in the data stores 630 may, in some implementations, be provided over the network(s) 608 to user devices 604. In some cases, the data stores 630 may additionally or alternatively include stored application programs and/or drivers. Alternatively or additionally, the data stores 630 may store standard and/or proprietary software libraries, and/or standard and/or proprietary application user interface (API) libraries. Information stored in the data stores 630 may be machine-readable object code, source code, interpreted code, or intermediate code.

The drivers 634 include programs that may provide communication between components in a node. For example, some drivers 634 may provide communication between the operating system 628 and additional storage 622, computing device 624, and/or I/O device 626. Alternatively or additionally, some drivers 634 may provide communication between application programs 632 and the operating system 628, and/or application programs 632 and peripheral devices accessible to the service provider computer. In many cases, the drivers 634 may include drivers that provide well-understood functionality (e.g., printer drivers, display drivers, hard disk drivers, Solid State Device drivers). In other cases, the drivers 634 may provide proprietary or specialized functionality.

The service provider computer(s) or servers may also include additional storage 622, which may include removable storage and/or non-removable storage. The additional storage 622 may include magnetic storage, optical disks, solid state disks, flash memory, and/or tape storage. The additional storage 622 may be housed in the same chassis as the node(s) 602a-602h or may be in an external enclosure. The memory 618 and/or additional storage 622 and their associated computer-readable media may provide non-volatile storage of computer-readable instructions, data structures, program modules, and other data for the computing devices. In some implementations, the memory 618 may include multiple different types of memory, such as SRAM, DRAM, or ROM.

The memory 618 and the additional storage 622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 618 and the additional storage 622 are examples of computer storage media. Additional types of computer storage media that may be present in the node(s) 602a-602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 602a-602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 602a-602h may also include I/O device(s) 626, such as a keyboard, a mouse, a pen, a voice input device, a touch input device, a display, speakers, a printer, and the like. The node(s) 602a-602h may also include one or more communication channels 636. A communication channel 636 may provide a medium over which the various components of the node(s) 602a-602h can communicate. The communication channel or channels 636 may take the form of a bus, a ring, a switching fabric, or a network.

The node(s) 602a-602h may also contain computing device(s) 624 that allow the node(s) 602a-602h to communicate with a stored database, another computing device or server, user terminals and/or other devices on the network(s) 600. The computing device(s) 624 of FIG. 6 may include similar components discussed with reference to the computing device 500 of FIG. 5.

In some implementations, the computing device 624 is a peripheral device, such as a PCI-based device. In these implementations, the computing device 624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 508 may implement NVMe, and the computing device 624 may be connected to a computing system using a PCIe interface.

A PCI-based device may include one or more functions. A "function" describes operations that may be provided by the computing device 624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the computing device 624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:

generating, at compile time, instructions configured for training a machine learning (ML) model on a training input tensor;

receiving a machine learning graph of the AI model, the machine learning graph including a set of operators, wherein each operator of the set of operators receives an input tensor and outputs an output tensor, the set of operators including a first operator and a second operator, the first operator receives a first input tensor and outputs a first output tensor, the first input tensor derived from the training input tensor, the second operator receives a second input tensor, wherein the first output tensor is the second input tensor, wherein each input tensor and each output tensor are comprised of fields holding values;

identifying that the first operator is a mask operator configured to apply a mask to the first input tensor, the mask operator associated with a mask subtensor and a mask value, wherein the mask subtensor includes the fields of the first input tensor that will be set to the mask value;

generating a mapping associating each input tensor of each of the set of operators to a compute range, a mask range, and a compute subtensor, wherein the compute subtensor includes the fields of the first input tensor that are not included by the mask subtensor;

determining the compute range of the first input tensor;

determining the mask range of the first input tensor based on the mask value;

determining the compute subtensor of the first input tensor based on an affine expression associated with the mask operator;

determining the compute range of the second input tensor based on range analysis of the compute range of the first input tensor;

determining the mask range of the second input tensor based on the mask range of the first operator and the compute range of the second input tensor;

determining the compute subtensor of the second input tensor based on the compute subtensor of the first operator;

generating a first set of predicates, associated with the second operator, for computations on the fields of the mask subtensor based on the mask range of the second input tensor and the compute subtensor of the second input tensor;

determining a subset of the instructions to eliminate based on the first set of predicates;

eliminating the subset of the instructions.

2. The computer-implemented method of claim 1, further comprising:

generating a second set of predicates, associated with the second operator, for computing the mask value for each field in the mask subtensor based on the mask range of the second input tensor;

wherein determining the subset of the instructions to eliminate is further based on the second set of predicates.

3. The computer-implemented method of claim 1, further comprising:

generating a second set of predicates, associated with the first operator, for computations on the fields of the mask subtensor based on the mask range of the first input tensor and the compute subtensor of the first input tensor;

wherein determining the subset of the instructions to eliminate is further based on the second set of predicates.

4. The computer-implemented method of claim 1, further comprising:

generating a second set of predicates, associated with the first operator, for computing the mask value for each field in the mask subtensor based on the mask range of the first input tensor;

wherein determining the subset of the instructions to eliminate is further based on the second set of predicates.

5. The computer-implemented method of claim 1, wherein the second operator is a non-mask operator.

6. A computer-implemented method, comprising:

generating, at compile time, instructions configured for training an artificial intelligence (AI) model on a training input tensor;

receiving a machine learning graph of the AI model, the machine learning graph including a set of operators including a first operator, wherein the first operator receives a first input tensor that is comprised of fields holding values;

identifying that the first operator is a mask operator configured to apply a mask to the first input tensor, wherein the mask operator is associated with a mask subtensor and a mask value, and wherein the mask subtensor includes the fields of the first input tensor that will be set to the mask value;

determining a mask range of the first input tensor based on the mask value;

determining a compute subtensor of the first input tensor based on the mask operator;

generating a first set of predicates, associated with the first operator, for computations on the fields of the mask subtensor based on the mask range of the first input tensor and the compute subtensor of the first input tensor;

determining a subset of the instructions to eliminate based on the first set of predicates; and eliminating the subset of the instructions.

7. The computer-implemented method of claim 6, further comprising:

generating a second set of predicates, associated with the first operator, for computing the mask value for each field in the mask subtensor based on the mask range of the first input tensor;

wherein determining the subset of the instructions to eliminate is further based on the second set of predicates.

8. The computer-implemented method of claim 7, further comprising generating memset instructions for each field in the mask subtensor based on the second set of predicates, wherein the memset instructions set the fields in the mask subtensor to the mask value.

9. The computer-implemented method of claim 6, wherein the set of operators includes a second operator, wherein the second operator receives a second input tensor, wherein an output tensor of the first operator is the second input tensor.

10. The computer-implemented method of claim 9, wherein the first operator receives a third input tensor.

11. The computer-implemented method of claim 10, further comprising:

determining a compute range of the second input tensor based on the compute range of the first input tensor and a compute range of the third input tensor;

determining the mask range of the second input tensor based on one or more of: the mask range of the first input tensor, the mask range of the third input tensor, the compute range of the first input tensor, or the compute range of the third input tensor; and determining the compute subtensor of the second input tensor based on the compute subtensor of the first input tensor and the compute subtensor of the third input tensor.

12. The computer-implemented method of claim 11, further comprising:

generating a second set of predicates, associated with the second operator, for computations on the fields of the mask subtensor based on the mask range of the second input tensor and the compute subtensor of the second input tensor;

wherein, determining the subset of the instructions to eliminate is further based on the second set of predicates.

13. The computer-implemented method of claim 11, further comprising:

generating a second set of predicates, associated with the second operator, for computing the mask value for each field in the mask subtensor based on the mask range of the second input tensor;

wherein, determining the subset of the instructions to eliminate is further based on the second set of predicates.

14. A computer-program product tangibly embodied in a non-transitory machine-readable storage medium, the computer-program product including instructions configured to cause a processor to perform operations comprising, comprising:

generating, at compile time, instructions configured for training an artificial intelligence (AI) model on a training input tensor;

receiving a machine learning graph of the AI model, the machine learning graph including a set of operators including a first operator, wherein the first operator receives a first input tensor that is comprised of fields holding values;

identifying that the first operator is a mask operator configured to apply a mask to the first input tensor, wherein the mask operator is associated with a mask subtensor and a mask value, and wherein the mask subtensor includes the fields of the first input tensor that will be set to the mask value;

determining a mask range of the first input tensor based on the mask value;

determining a compute subtensor of the first input tensor based on the mask operator;

generating a first set of predicates, associated with the first operator, for computations on the fields of the mask subtensor based on the mask range of the first input tensor and the compute subtensor of the first input tensor;

determining a subset of the instructions to eliminate based on the first set of predicates; and eliminating the subset of the instructions.

15. The computer-program product of claim 14, further comprising:

generating a second set of predicates, associated with the first operator, for computing the mask value for each field in the mask subtensor based on the mask range of the first input tensor;

wherein determining the subset of the instructions to eliminate is further based on the second set of predicates.

16. The computer-program product of claim 15, further comprising generating memset instructions for each field in the mask subtensor based on the second set of predicates, wherein the memset instructions set the fields in the mask subtensor to the mask value.

17. The computer-program product of claim 14, wherein the set of operators includes a second operator, wherein the second operator receives a second input tensor, wherein an output tensor of the first operator is the second input tensor, wherein the first operator receives a third input tensor.

18. The computer-program product of claim 17, further comprising:

determining a compute range of the second input tensor based on the compute range of the first input tensor and a compute range of the third input tensor;

determining the mask range of the second input tensor based on one or more of: the mask range of the first input tensor, the mask range of the third input tensor, the compute range of the first input tensor, or the compute range of the third input tensor; and determining the compute subtensor of the second input tensor based on the compute subtensor of the first input tensor and the compute subtensor of the third input tensor.

19. The computer-program product of claim 18, further comprising:

generating a third set of predicates, associated with the second operator, for computations on the fields of the mask subtensor based on the mask range of the second input tensor and the compute subtensor of the second input tensor;

wherein, determining the subset of the instructions to eliminate is further based on the third set of predicates.

* * * * *